US005461701A

United States Patent [19]
Voth

[11] Patent Number: 5,461,701
[45] Date of Patent: Oct. 24, 1995

[54] SYSTEM AND METHOD FOR PERIPHERAL DATA TRANSFER

[75] Inventor: David W. Voth, Redmond, Wash.

[73] Assignee: Microsoft Corporation, Redmond, Wash.

[21] Appl. No.: 992,703

[22] Filed: Dec. 18, 1992

[51] Int. Cl.⁶ .............................. H04J 3/02; G06F 13/38
[52] U.S. Cl. .............................................................. 395/101
[58] Field of Search .................................... 395/100, 101, 395/109, 111, 114, 118, 275, 325, 400; 364/239.9, 240.1

[56] References Cited

U.S. PATENT DOCUMENTS

| | | | |
|---|---|---|---|
| 3,742,457 | 6/1973 | Calle et al. | 340/172.5 |
| 4,374,416 | 2/1983 | Catiller et al. | 364/200 |
| 4,490,784 | 12/1984 | Ives et al. | 364/200 |
| 4,542,457 | 9/1985 | Mortensen et al. | 364/200 |
| 4,998,198 | 3/1991 | Chan | 364/200 |
| 5,029,124 | 7/1991 | Leahy et al. | 364/900 |
| 5,031,115 | 7/1991 | Hayashi | 364/519 |
| 5,157,761 | 10/1992 | Hawkes | 395/107 |
| 5,291,580 | 3/1994 | Bowden, III et al. | 395/425 |
| 5,303,349 | 4/1994 | Warriner et al. | 395/275 |

FOREIGN PATENT DOCUMENTS

WO93/23812  11/1993  WIPO ............................ G06F 13/38

OTHER PUBLICATIONS

IBM Technical Disclosure Bulletin, 26:5783–5784, 1984.
IBM Technical Disclosure Bulletin, 33:88–89, 1990.

Primary Examiner—Mark R. Powell
Assistant Examiner—Gabriel I. Garcia
Attorney, Agent, or Firm—Seed & Berry

[57] ABSTRACT

A system and method for increasing the rate of data transfer from a host computer to a peripheral without the need for special hardware within the host computer or a special interface cable coupling the host computer to the peripheral. Some simple hardware modifications are required within the peripheral interface. Data is transferred from the host computer to the peripheral in 4 KByte bursts. Handshaking occurs between the host computer and the peripheral only between bursts. Each byte of peripheral data is apportioned into two nibbles within the host computer. Two bytes are transmitted from the host computer to the peripheral, each transmitted byte containing two data clocks, a panty bit, and a nibble of peripheral data. Within the peripheral, a clock circuit receives the two clock signals from each transmitted byte and generates delayed signals to latch the nibbles of peripheral data into storage registers. The latching signals are generated only after the logic transition of both clock signals. The storage registers are used to reform the original byte of peripheral data from the two nibbles. In addition, one of the transmitted bytes contains a flag to signal the peripheral that the data that follows is out-of-band data. This allows the host computer to address registers within the peripheral. Data compression may also be implemented to increase the speed of data transfer. Out-of-band data can include a data number indicating the number of times that a particular byte of peripheral data should be repeated. The system can be easily implemented on any Centronics compatible printer system to increase the rate of data transfer.

45 Claims, 7 Drawing Sheets

Fig. 3B

SYSTEM AND METHOD FOR PERIPHERAL DATA TRANSFER

TECHNICAL FIELD

The present invention is related generally to the transfer of data to a peripheral, and more specifically, to a system and method for improving the data transfer rate between a host computer and a peripheral.

BACKGROUND OF THE INVENTION

Numerous computers and printers have been developed for home and office use. Occasionally, a de facto standard for hardware evolves by virtue of one company being the first to develop a particular piece of hardware. For example, the interface hardware for printers connected to a host computer evolved around what is commonly called the Centronics Printer Port. This is a data I/O port on the host computer for connecting a printer to the host computer via parallel printer interface cable. Computer manufacturers and printer manufacturers provided "Centronics Compatible" printer interfaces, making it the de facto standard for host computer-printer interfaces.

The Centronics Compatible standard has been adopted by the Institute for Electrical and Electronic Engineers (IEEE) as part of the P1284 standard "Standard Signalling Method for a Bidirectional Parallel Peripheral Interface for Personal Computers." While IEEE P1284 describes a bidirectional signalling method for two way communication between the printer and the host computer, the Centronics Compatible standard is adopted as the "Compatible Mode" for data transfers from the host computer to the printer.

Unlike modern printers, which typically contain microprocessors and memory, early printers typically had little or no computing power. These so called "dumb" printers are still frequently used today. Data is transferred from the host computer to the printer, one byte at a time, and stored in a data register such as a first-in first-out (FIFO) buffer. The printer receives printer data from the host computer via a computer interface cable. The printer data must be transferred from the host computer to the printer in the sequence in which the data will be printed. Typically, the data transferred from the host computer to the printer is data representing alphanumeric characters. The most common code for this type of data transfer is the American Standard Code for Information Interchange (ASCII) data bytes corresponding to the characters, which uses eight bit data bytes to represent various alphanumeric characters.

In an example illustrated in FIG. 1, a printer 10 will begin printing alphanumeric characters starting at the upper left-hand corner of a printed page 12. The ASCII character data bytes corresponding to the phrase "This is a test." are transferred from a host computer 16 to the printer 10 in the exact sequence in which the characters are to be printed on the printed page 12. If the user wishes to print the message in a different location on the printed page 12, the host computer 16 will transfer to the printer 10 a series of ASCII character data bytes corresponding to line feed characters, tabs, spaces, and the like. Thus, the printer 10 only receives the data and prints the data, and does not perform any data processing such as calculating positions for graphics data or plotting lines as may be done with more sophisticated printers such as a laser printer.

An I/O interface 14 within the host computer 16 controls the transfer of data from the host computer to the printer 10. The I/O interface 14 first checks the status of the printer 10 to make sure that the printer is ready to receive data from the host computer 16. A status line 17 within a printer interface 18 indicates the current status of the printer 10. A central processor unit (CPU) 22 within the host computer 16 transfers a byte of data to the I/O interface 14 from a memory 24 or other suitable storage location. The CPU 22 is coupled to the memory 24 and the I/O interface 14 by a bus 26 that carries data and control signals. After a delay, caused by propagation of the data on an interface cable 28 from the I/O interface 14 to the printer interface 18, the byte of data appears at the inputs to the printer interface 18. The I/O interface 14 waits a predetermined period of time to allow the data lines to settle at the inputs of the printer interface 18 and then asserts a control line to transfer the data to the printer 10. The printer interface 18 changes the logic state of the status line 17 to indicate that the printer 10 is busy and cannot accept additional data. When ready for the next data byte, the printer 10 changes the logic state of the status line 17 to indicate to the host computer 16 that the next byte of data can be transferred to the printer. This process is repeated for every data byte transferred from the host computer 16 to the printer 10.

FIG. 2 illustrates the typical timing waveforms for a data I/O transfer using the Centronics Compatible standard. As discussed above, the I/O interface 14 must first check the status of the printer 10. The status line 17, which is typically called the BUSY status line within the printer 10 indicates the current status of the printer. If the BUSY line is at a logic high level, the printer 10 is busy and cannot accept data. If the printer can accept data, the BUSY line is at a logic low level. Note that the terms "high" and "low" refer to the high logic level and the low logic level, respectively.

Data is transferred from the host computer 16 to the printer 10 on the falling edge of a STROBE control line as it goes low. This is sometimes referred to as "asserting" the STROBE line. The term "assert" refers to making a signal logically true, regardless of whether the signal is active high or low. Conversely, the term "deasserting" refers to making a signal line logically false, regardless of whether the signal is active high or low.

When the I/O interface 14 in the host computer 16 transfers the data, there will be a period of time during which the data signals are propagating down the interface cable 28 from the host computer 16 to the printer 10. In addition, some hardware, such as data registers or latches (not shown) within the printer interface 18, require that the data lines be settled for a period of time before the clock changes states to enter the data. This time, typically called a data setup time, may be as high as 50 nanoseconds. A typical I/O interface 14 may not assert the STROBE line for several microseconds after the data has been transferred to allow for propagation delay and data setup requirements. Under the IEEE P1284 standard for the Compatible Mode, the data lines must be settled in a logic high or low level for at least 500 nanoseconds before the STROBE line goes low, as indicated by the reference letter A in FIG. 2. The STROBE line must stay low for at least 500 nanoseconds, as indicated by the reference letter B, however older Centronics Compatible interfaces may keep the STROBE line low for as long as 5 microseconds. Under IEEE P1284, the data must remain stable for at least 500 nanoseconds after the STROBE line returns high, as indicated by the reference letter C in FIG. 2.

The BUSY line in the printer changes states from a low logic level to a high logic level in response to the assertion of the STROBE line. Under IEEE P1284, the BUSY line must go high within 500 nanoseconds of the STROBE line going low, as indicated by the reference letter D, and must remain high for at least 500 nanoseconds, as indicated by the reference letter E. Note that there is no maximum time specified for the BUSY line to be high. This is due to the fact that printer activities cannot be predicted. For example, if the buffer (not shown) in which the data is stored in the printer becomes full, the BUSY line may remain high for an indeterminate period of time. Similarly, if the printer 10 has an error such as a paper jam, the BUSY line will remain high.

In addition to the BUSY line, another status line, ACK, indicates that the printer 10 has received the data. The ACK line goes low after the BUSY line goes high and must remain low for at least 500 nanoseconds, as indicated by the reference letter F. The BUSY line returns low no sooner than the setting of the ACK line to a high level, as indicated by the reference letter G. When the BUSY line returns low, the next transfer cycle may begin immediately. This entire cycle is repeated for each data byte transferred from the host computer 16 to the printer 10.

As can readily be seen from the illustration of FIG. 2, the transfer of a single byte of data takes several clock cycles of the computer clock. The IEEE P1284 Compatible Mode interface must perform this same sequence for each byte of data transferred to the printer. If one assumes an I/O transfer cycle of 1.0 megabytes/second, then the maximum data transfer rate for the IEEE P1284 Compatible Mode printer interface is 200 Kbytes/second. This data transfer rate is slow when one considers that the host computer may not be able to perform other tasks while the document is being printed.

Therefore, it can be appreciated that there is a significant need for an system and method of improving the data transfer rate from a host computer to a printer without the need for hardware changes within the host computer or a special printer cable.

SUMMARY OF THE INVENTION

The invention is embodied in a system that divides a byte of printer data in half and transmits two bytes to the printer. The first portion of each transmitted data byte contains one half of the printer data byte. The second portion of each transmitted data byte contains two clock signals having opposite polarity. A clock detection circuit within the printer detects logic transitions from the clock signals in the transmitted bytes and generates a delayed signal to store each of the transmitted data bytes. The byte of printer data is restored by combining the first portion of each of the two transmitted data bytes.

In one embodiment, a parity bit is also transmitted in the second portion of each data byte. A parity checking circuit in the printer generates a parity error signal if a parity error occurs.

The second portion of the one transmitted data byte may also contain an indicator that the transmitted data bytes are out-of-band data.

An input buffer register may be used to buffer the transmitted data bytes.

DETAILED DESCRIPTION OF THE INVENTION

The present invention provides a system and method for increasing the speed of data transfer on an IEEE P1284 Compatible Mode computer interface. The present invention requires some additional hardware within the printer, but uses an IEEE P1284 Compatible Mode printer interface within the host computer. Furthermore, the present invention does not require a special printer cable interconnecting the printer and the host computer. While the following discussion involves printer data transfer, the inventive system and method is equally applicable to any peripheral.

Figure 1:
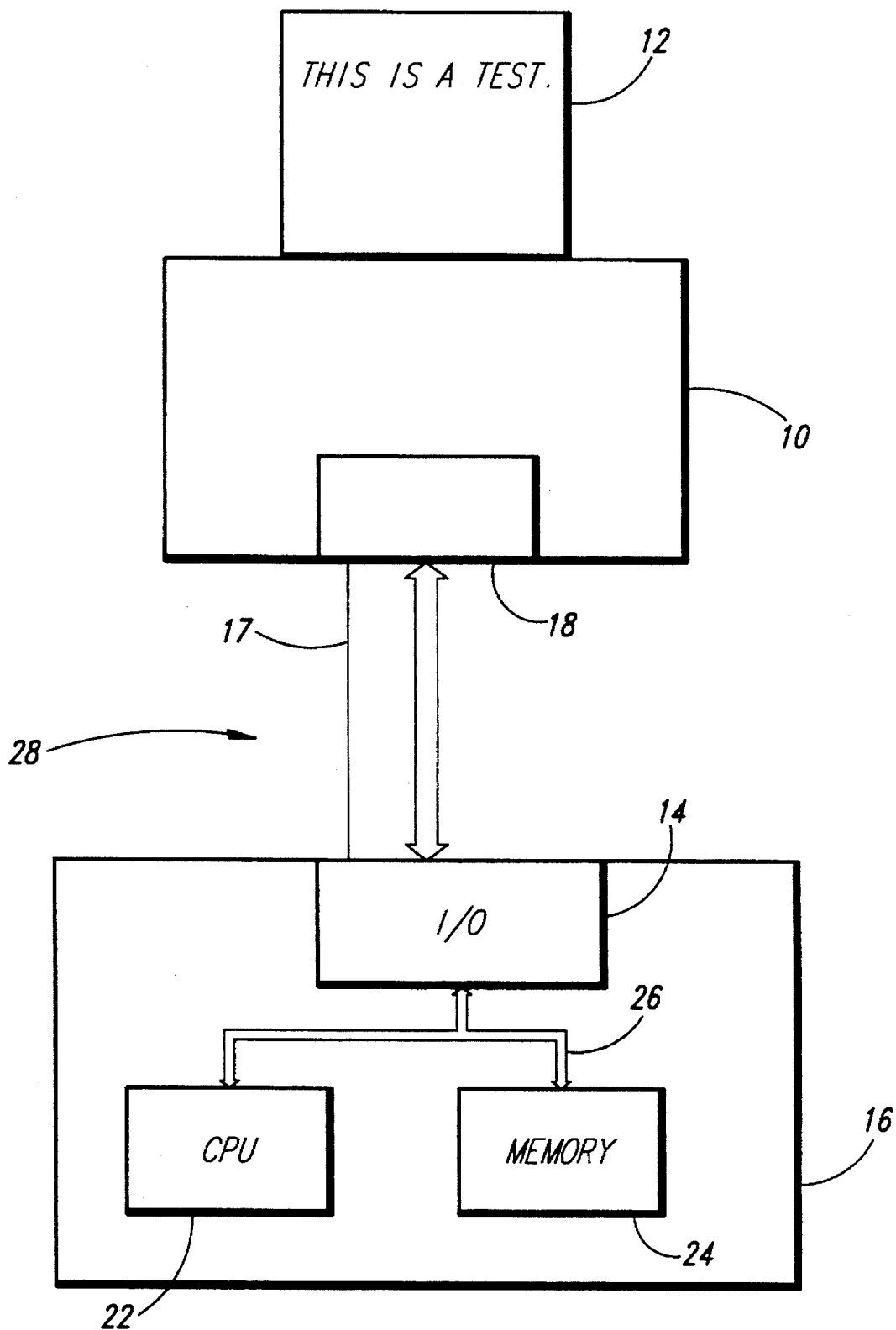
FIG. 1 is a functional block diagram of a typical prior art host computer-printer system.
Figure 2:
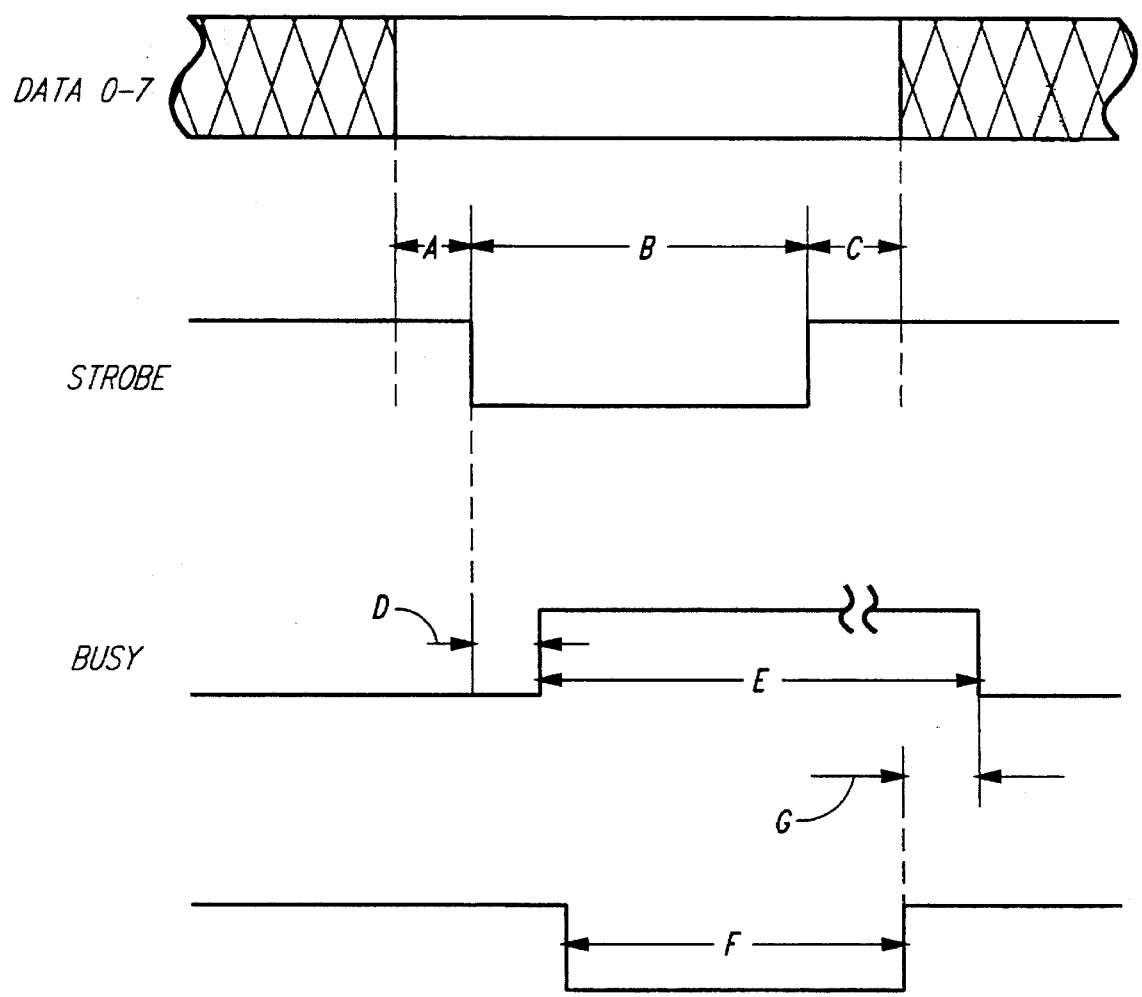
FIG. 2 is a timing diagram of a typical data I/O transfer by the prior art system of FIG. 1.
Figure 3A:
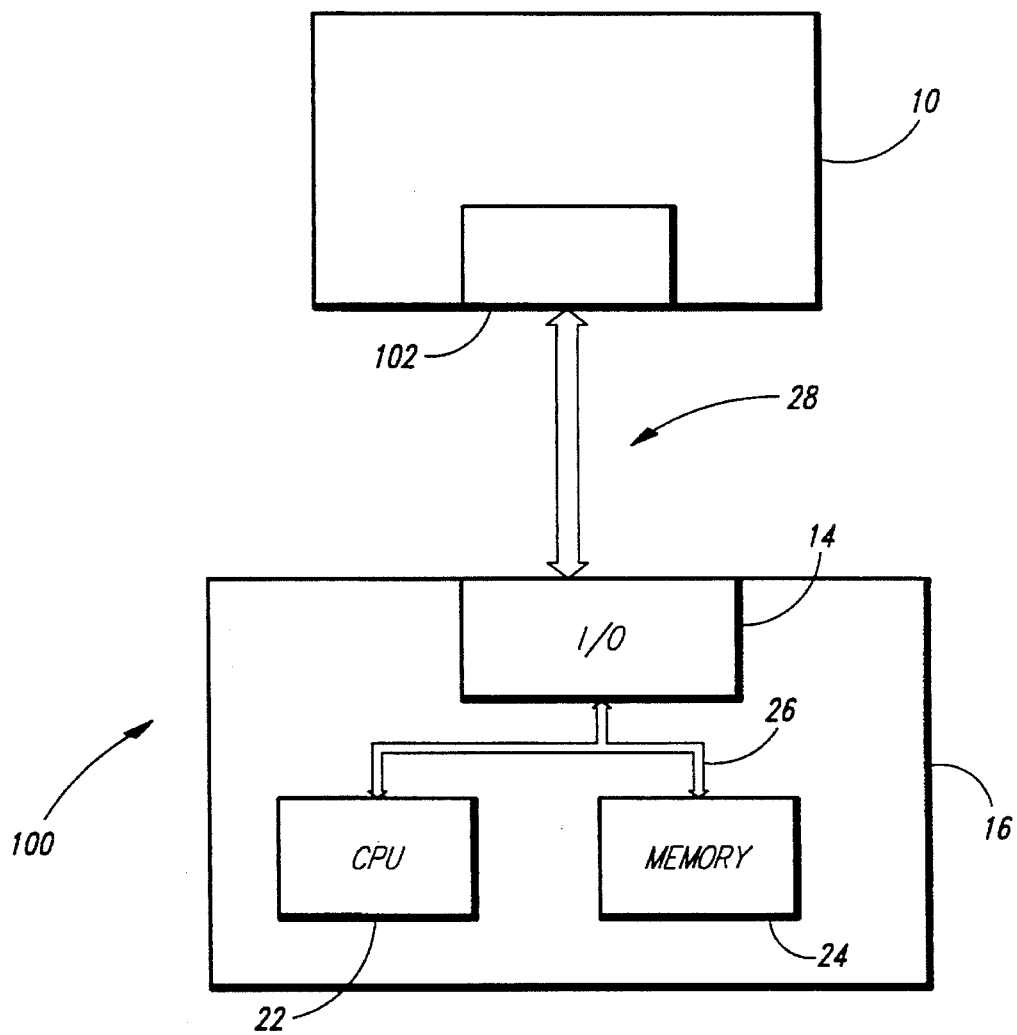
FIG. 3A is a functional block diagram of the system of the present invention.

The present invention is embodied in a system 100, shown in the functional block diagram of FIG. 3A and includes a printer interface 102 located within the printer 10. The system 100 includes the conventional host computer 16 which does not use Direct Memory Access (DMA) mode because a DMA interface is complex and not readily available for use with a printer. Instead, the host computer 16 contains a Industry Standard Architecture (ISA) I/O interface 14, which is well known in the prior art. The I/O interface 14 is coupled to the printer interface 102 by the interface cable 28, which is a standard Centronics compatible printer cable.

Figure 3B:
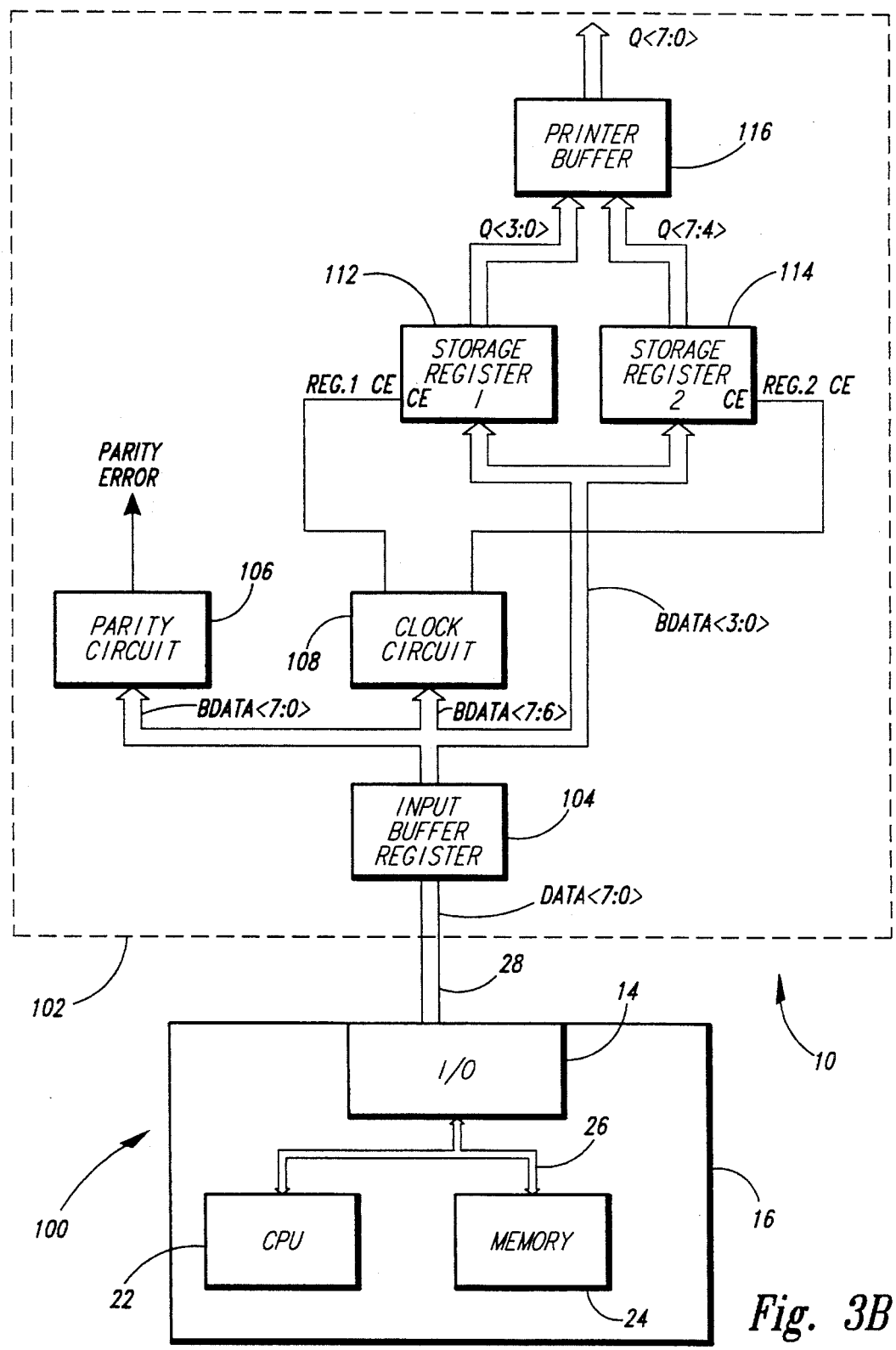
FIG. 3B is a detailed functional block diagram of the inventive interface of FIG. 3 A.

As shown in FIG. 3B, within the printer interface 102 is an input buffer register 104 which is designed to receive each transmitted byte of data from the host computer 16. The input buffer register 104 temporarily stores the received data bytes. The input buffer register 104 buffers the signals received from the data lines on the interface cable 28. Each of the sequentially received data bytes is temporarily stored within the input buffer register 104. The stored data bytes in the input buffer register 104 are coupled to a parity circuit 106, which is designed to detect a parity error. A clock circuit 108 receives two bits of each stored data byte and generates the delayed clock signals discussed above. A first storage register 112 and a second storage register 114 sequentially receive a portion of the first and second stored data bytes, respectively. The outputs of the first and second storage registers 112 and 114 are simultaneously loaded into a printer buffer register 116, which may be part of the normal printer buffer, such as a FIFO buffer routinely used in the prior art. Greater details on the operation of the printer interface 102 are provided below.

Instead of transferring a byte of printer data on the falling edge of the STROBE signal, as is common in the prior art, the present invention transfers the 8 bit byte of printer data in two 4 bit nibbles in two separate data bytes Byte0 and Byte1 transferred from the host computer 16 to the printer 10. Each of the data bytes, Byte0 and Byte1, includes a first and second portions. The two nibbles of printer data comprise the first portion of the data bytes Byte0 and Byte1. As will be described below, the second portion of each of the two data bytes Byte0 and Byte1 contain other signals. Thus, the present invention allows the transfer of a byte of printer data with two I/O transfers. Each I/O transfer to the printer 10 contains not only one half of the byte of printer data, but also two clock signals, and a parity bit. In addition, one of the I/O transfers contains a flag to indicate to the printer that "out-of-band" data is being transferred. Out-of band data will be discussed in detail below.

The data format used is indicated in Table 1 below where the first column indicates the normal signal designation for a Centronics compatible interface. The data bits D7 to D0 in a normal I/O transfer are replaced with the signals indicated in the column for Byte0 and Byte1. In particular, the first portion of Byte 0 contains Data 3 to Data 0, and the first portion of Byte1 contains Data 7 to Data 4. The second portion of Byte0 and Byte1 contains the two clock signals CLOCK and ~CLOCK, and the parity bit. Byte0 also contains the out-of-band flag, while the corresponding bit in Byte1 is presently undefined. The CLOCK and ~CLOCK signals become part of each byte transmitted to the printer 10. Note that the CLOCK and ~CLOCK signals have the opposite polarity and that the polarity changes from the Low Nibble to the High Nibble. This allows the printer interface 102 to distinguish the Low Nibble from the High Nibble.

TABLE 1

Bit Assignment During Data Transfers

| Centronics Signals | Value during Byte0 transfer | Value during Byte1 transfer |
| --- | --- | --- |
| D7 | CLOCK = 1 | CLOCK = 0 |
| D6 | ~CLOCK = 0 | ~CLOCK = 1 |
| D5 | Parity bit | Parity bit |
| D4 | Out-of-Band flag | Undefined |
| D3 | Data 3 | Data 7 |
| D2 | Data 2 | Data 6 |
| D1 | Data 1 | Data 5 |
| D0 | Data 0 | Data 4 |

Some problems created by the design approach of the present invention must be overcome for successful operation. First, the typical driver integrated circuit within the printer 10 has a different transition rate for a digital signal going from a high logic level to a low logic level than the transition rate for a digital signal going from a low logic level to a high logic level. In a typical Centronics Compatible interface, the high to low transitions time is approximately 50 nanoseconds, while the low to high transition rate is approximately 200 nanoseconds. Therefore, data cannot be reliably latched on the basis of a single clock transition.

Second, the Centronics Compatible interface is susceptible to noise problems relating to cross-talk between signal lines within the interface cable 28. The "glitches" caused by cross-talk can cause errors in the data transmission. Finally, the interface cable 28 itself introduces a propagation delay of approximately 45 nanoseconds in a 15 foot cable. The propagation delay can cause timing problems as well as simply delaying the transmission of data from the host computer 16 to the printer 10.

The present invention overcomes these problems by using two data clocks of opposite polarities, and requiring that both data clocks make a transition before the data is latched. Thus, the system of the present invention latches data on the basis on two clock transitions, which is more reliable than a single clock transition. According to the principles of the present invention, the two data clocks also improve noise immunity because the printer interface delays latching the data for a predetermined delay after the data clocks have both made a transition from a first logic level to a second logic level. The delay prevents the printer from responding to glitches that may occur due to cross-talk.

The CLOCK and ~CLOCK signals are transferred along with each nibble of printer data so that the effect of the propagation delay on the interface cable 28 is negated. The CLOCK and ~CLOCK signals are part of each transferred byte of data, therefore, the CLOCK and ~CLOCK signals arrive at the printer interface 102 at the same time. These features have the advantage that the host computer 16 can transmit data at approximately twice the rate of prior art systems without any loss in performance due to cross-talk or noise.

As seen from Table 1 and discussed above, a byte of printer data is broken into two separate nibbles of printer data within the host computer 16, each requiring an I/O operation by the host computer 16. Unlike the prior art data transfers, which use five I/O operations to transfer a byte of data to the printer 10, the present invention requires only two I/O operations to transfer a byte of data to the printer. In the example above, where the I/O transfer cycle was assumed to be 1.0 megabytes/second, the transfer rate for the present invention is 500 Kbytes/second. It is obvious to those of ordinary skill in the art that the designation of the data bits in Table 1 should not be considered a limitation of the present invention. Obviously, the CLOCK and ~CLOCK could be any two data bits. Similarly, the Parity bit, the Out-Of-Band Flag bit, and the Data bits could be designated in any convenient manner or order other than the example illustrated in Table 1.

While the system 100 uses an ISA standard I/O interface 14 in the host computer 16, the printer interface 102, shown in FIGS. 3A and 3B, is not currently available in conventional printers and must be added. The additional hardware may be added to the printer 10 as an add-on board within the printer 10 or in a small external box or cartridge.

In normal operation, the present invention operates in a burst mode in which a 4 Kbyte block of data is transferred from the host computer 16 to the printer 10. Once a burst transfer is initiated, it cannot be stopped. The size of the data burst should not be considered a limitation in the invention. The typical printer buffer 116 has a buffer size of 64 KBytes or more, so that data can be easily transferred in 4 Kbyte bursts. However, data bursts of other sizes may be used equally well with the system 100.

A handshake is issued between bursts to provide control over the flow of data from the host computer 16 to the printer 10. The presently preferred embodiment uses the IEEE P1284 ECP mode handshaking. In this mode, an address is sent to the printer 10 between bursts of printer data. The printer 10 may use this time to stall or delay the transfer of the next burst of data until there is room in the printer buffer 116 for another 4 Kbyte burst of data. For each burst of data transferred to the printer 10, the following sequence occurs:

1. An address is placed on the data bus;
2. The STROBE line is driven low by the host computer 16;
3. When the printer 10 has room in the printer buffer 116 to accept a burst of data, the printer 10 sets the BUSY line high;
4. The STROBE line is driven high by the host computer 16;
5. The printer 10 sets the BUSY line low; and
6. The 4 Kbyte data burst is sent.

Figure 4:
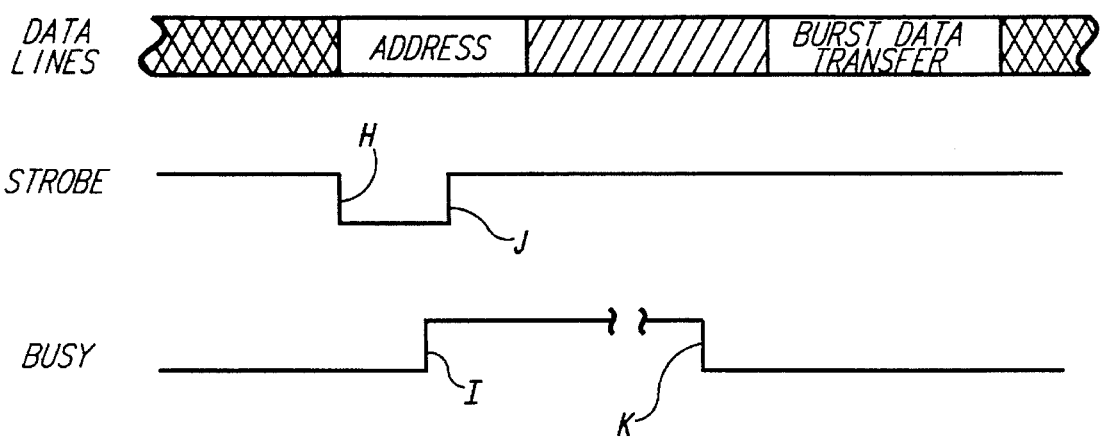
FIG. 4 is a timing diagram of data I/O transfer by the inventive system of FIG. 3B.

As illustrated in FIG. 4, the address is placed on the data lines. In preparation for a 4 Kbyte data burst, the address 0 is placed on the data lines to indicate to the printer 10 that a data transfer will occur. The host computer 16 then sets the STROBE line low, as indicated by the reference letter H. When the printer 10 has enough room in the printer buffer 116 to accept a 4 Kbyte burst of data, the printer 10 sets the BUSY line high, as indicated by the reference letter I. As an acknowledgment, the host computer 16 sets the STROBE line high, as indicated by the reference letter J. When the printer 10 is ready to accept the 4 Kbyte burst of data, the printer sets the BUSY line low, as indicated by the reference letter K. The 4 Kbyte burst of data may now be transferred from the host computer 16 to the printer 10. Note that the time between the host computer 16 setting the STROBE line low and the printer 10 setting the BUSY line low is a variable time that is controlled by the printer, and is dependent on the data processing within the printer. The same handshaking sequence is repeated for each burst of data, however, no handshaking occurs for each byte of data, as is the case with prior art systems. Thus, the system 100 can transfer a large block of data with only a few handshaking steps between the host computer 16 and the printer 10.

As discussed above, the data clocks CLOCK and ~CLOCK, are transmitted to the printer interface 102 along with the data transferred in each of the two I/O operations illustrated in Table 1. The two data clocks are simply inverted versions of each other. In the presently preferred embodiment, the data bits D7 and D6 are used for CLOCK and ~CLOCK, respectively. The data bits D7 and D6 are the two most significant bits in each transferred byte of data (see Table 1). These bits are outputs from the input buffer register 104 (see FIG. 3B). In an alternative embodiment, no input buffer register 104 is used, and the transferred bytes of data from the host computer 16 are coupled directly to other circuit components in the printer interface 102.

Figure 5:
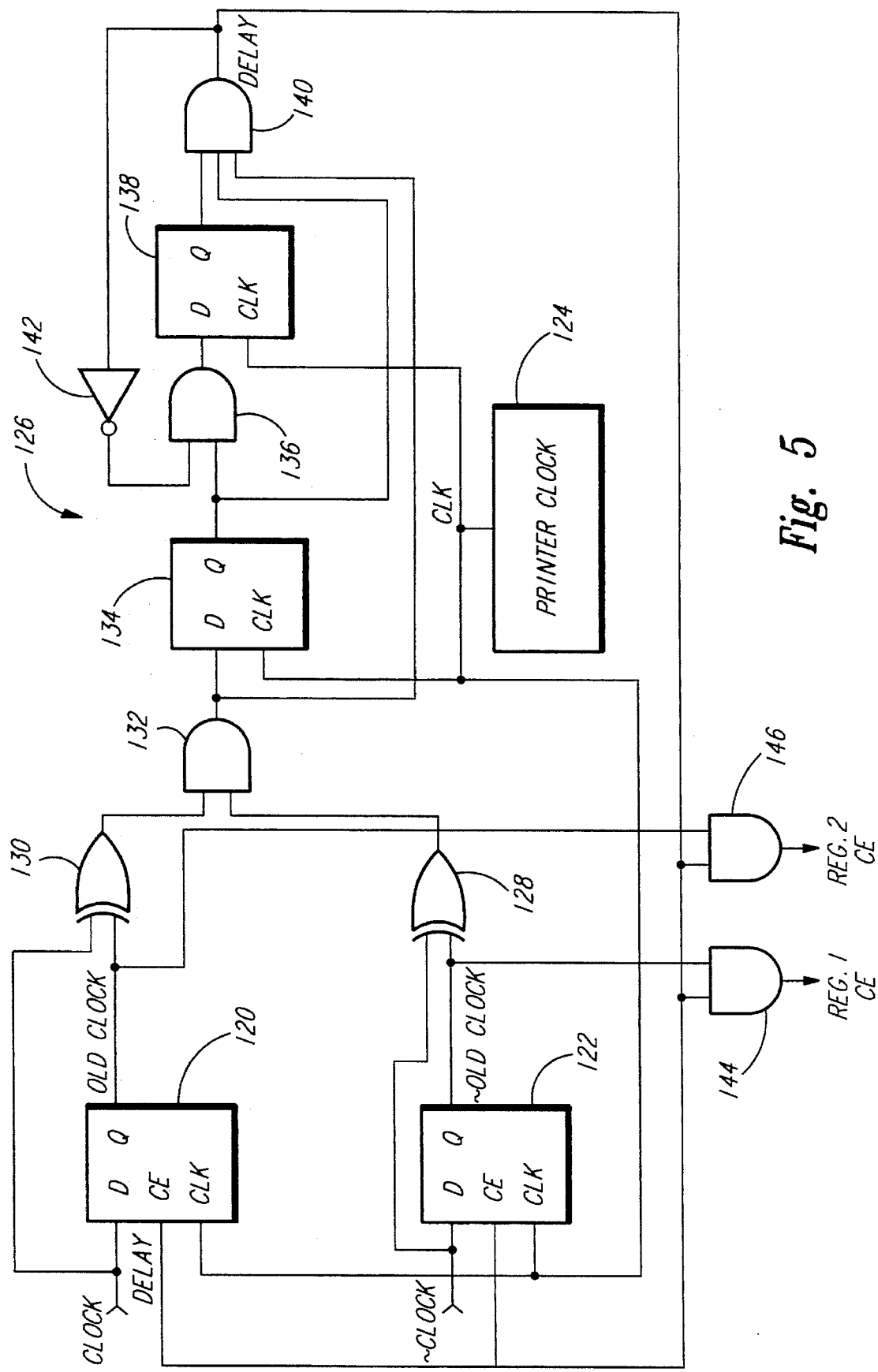
FIG. 5 is a functional block diagram of the clock circuit of the inventive system of FIG. 3B.

The details of the clock circuit 108 are shown in FIG. 5. A printer clock 124 within the printer 10 provides a high frequency clock for the clock circuit 108. The output of the printer clock 124, designated in FIG. 5 as CLK, may typically operate at approximately 8 Megahertz. Note that it is not necessary that the printer clock 124 be derived from the printer 10 for purposes of synchronization. Any clock of sufficient frequency will work with the present invention. A clock added to the printer interface 102 will work satisfactorily with the present invention.

A clock delay circuit 126, which has the CLOCK and ~CLOCK signals as inputs, is used to produce a delay, as discussed above, so that the printer interface 102 does not respond to glitches or cross-talk on the interface cable 28. The output of the clock delay circuit 126, designated as DELAY in FIG. 5, is coupled to various points throughout the clock circuit 108. Details of the clock delay circuit 126 are provided below.

Within the clock circuit 108, first and second clock registers 120 and 122 have data inputs coupled to CLOCK and ~CLOCK, respectively. The clock registers 120 and 122 have a clock input coupled to the printer clock 124. The clock register 120 and 122 also have chip enable inputs, designated in FIG. 5 as CE. The chip enable inputs, CE, are coupled to DELAY, the output of the clock delay circuit 126. The outputs, OLD CLOCK and ~OLD CLOCK, of the clock registers 120 and 122 are used to enable the first storage register 112 and the second storage register 114.

The DELAY signal is derived by the clock delay circuit 126 in which CLOCK and ~CLOCK, are inputs to a pair of exclusive-OR gates 128 and 130, respectively. The other input to the exclusive-OR gate 128 is OLD CLOCK, the output of the first clock register 120. Similarly, the other input to the exclusive-OR gate 130 is ~OLD CLOCK, the output of the second clock register 122. The outputs of the exclusive-OR gates 128 and 130 are inputs to an AND gate 132. The output of the AND gate 132 will be high only when both CLOCK and ~CLOCK have made a transition in logic states from the OLD CLOCK and ~OLD CLOCK outputs of the clock registers 120 and 122. Thus, the printer interface 102 will not begin the delay period until both CLOCK and ~CLOCK have made a logic transition.

The output of AND gate 132 is coupled to the data input of a first delay register 134, whose clock input is CLK from the printer clock 124. When the output of AND gate 132 is high, the next pulse from the printer clock 124 will cause the output of the delay register 134 to go high. The output or the first delay register 134 is coupled to an input to an AND gate 136. The signal, DELAY, from the clock delay circuit 126 is coupled through an inverter 142 to the other input of the AND gate 136. Assuming that the signal, DELAY, is low, both inputs to the AND gate 136 will be high, causing the output of the AND gate 136 to go high. The output of the AND gate 136 is coupled to the data input of a second delay register 138. The clock input to the second delay register 138 is CLK from the printer clock 124. Because of the logic arrangement previously described, the output of the second delay register 138 will go high exactly one clock pulse after the first delay register 134 goes high. The output of the second delay register 138 is coupled to the input of a three input AND gate 140. The other two inputs to the AND gate 140 are the output from AND gate 132 and the output of the first delay register 134. The output of the AND gate 140 is the signal DELAY. Because of the feedback of the inverted version of the signal, DELAY, through the AND gate 136, the data input to the second delay register 138 goes low when the output signal, DELAY, goes high. Thus, on the following pulse from the printer clock 124, the output of the second delay register 138, and the output signal, DELAY, will return low.

The clock delay circuit 126 has good noise immunity because it takes several clock cycles of the printer clock 124 to produce the DELAY output signal. Signals such as CLOCK and ~CLOCK must remain stable throughout the several clock cycles of the printer clock 124. The DELAY signal has reduced susceptibility to noise or cross-talk on the interface cable 28 (see FIG. 3B) because transients will not remain stable for the several clock cycles and thus will be ignored by the printer interface 102. The above description of the clock delay circuit 126 is provided as an example of one circuit to produce a delayed output signal after the transition of the two clock signals, CLOCK and ~CLOCK. It is obvious to those of skill in the art that numerous such delay circuits may be employed with satisfactory results. For example, a monostable multivibrator may be used to introduce a delay to the printer interface 102.

When the DELAY signal is produced, the Low Nibble of printer data, D3 to D0 or the High Nibble of printer data, D7 to D4 (see Table 1) is loaded into the first or second storage registers 112 and 114, respectively, depending on the polarity of CLOCK and ~CLOCK. As shown in Table 1, CLOCK is set high (and ~CLOCK is set low) for the transfer of Byte0, while CLOCK is set low (and ~CLOCK is set high) for the transfer of Byte 1. There are numerous well known techniques for enabling the first and second storage registers based on the logic levels of CLOCK and ~CLOCK. Once such technique, shown in FIG. 5, uses AND gate 144 with ~OLD CLOCK and the DELAY signal as inputs. When ~OLD CLOCK and the DELAY signal are both high, the chip enable, CE, of the first storage register 112 is enabled. The Low Nibble of data, D3 to D0 (see Table 1), is loaded into the storage register 112 with the next pulse from the printer clock 124. When Byte0 is transferred to the printer interface 102, the logic levels of OLD CLOCK and ~OLD CLOCK will be reversed. Another AND gate 146 is used to enable the second storage register 114. The inputs to the AND gate 146 are OLD CLOCK and the DELAY signal. Since the logic levels of OLD CLOCK and ~OLD CLOCK have reversed, as described above, the chip enable, CE, of the second storage register 114 will be enabled when both OLD CLOCK and DELAY are high. The High Nibble of data, D7 to D4 (see Table 1), is loaded into the second storage register 114 with the next pulse from the printer clock 124. As stated above, there are numerous other techniques that may be used satisfactorily with the system 100.

A parity bit is also transmitted from the host computer 16 to the printer 10 with each of the two I/O operations. The use of parity bits to detect transmission errors is well known and will not be discussed in detail. In the presently preferred embodiment, odd parity is used. With odd parity, the logic level of the parity bit is selected in order to make the data byte have an odd number of bits with a high logic level. As is well known in the art, a parity bit can be odd or even, and the selection of an odd parity bit should not be considered a limitation on the present invention. Processing parity errors is well known and will not be discussed herein.

As indicated above, the first byte of data transferred includes a flag to signal to the printer 10 that out-of-band data is being transmitted. Out-of-band data is data that is not intended to be printed. This may include data for registers in the printer to select the margins, for example. The data to change margins, or other parameters of the printer, includes the address of specific registers (not shown) within the printer 10 and the data to be stored within the specific registers. When addressing specific registers within the printer 10, the system 100 transmits Byte0 (see Table 1) with the Out-of-Band flag set high. This instructs the computer that the Low Nibble and High Nibble in Byte0 and Byte1 is Out-of-Band data. If the most significant bit (MSB) of the data being transferred to the printer 10 is high, the data in the Low Nibble and High Nibble is a register address. The seven remaining bits of data are the address of the specific register within the printer 10. One skilled in the art recognizes that each printer has different register addresses for different functions. With seven address bits, the system 100 can address up to 128 registers (ranging from 0 to 127). The printer 10 recognizes the address and prepares to load that register with data. Following the transfer of a register address to the printer 10, the host computer 16 will transfer the data to be loaded into the selected register whose address has just been specified by the previous data transfer. Thus, when the system 100 wishes to load a register with data, the first byte of data (transferred in two nibbles, as discussed above) contains the address of the register, followed immediately by the transfer of the data byte (also transferred in two nibbles) to be loaded into the selected register.

Out-of-band data also includes data compression information. The present invention uses "Run Length Encoding" (RLE) data compression to enhance the speed of data transfer from the host computer 16 to the printer 10. This well known form of data compression is used only when data characters are repeated. If a particular character is repeated a number of times, the RLE encoding transfers RLE data indicating the number of times that the following byte of printer data is to be repeated. If an RLE count is transferred to the printer 10, the system 100 sets the Out-of-Band flag high in Byte0, as previously described in the example of register addressing. However, if the data transferred in Byte0 and Byte1 is an RLE count, the MSB of the data is set low thus indicating to the printer 10 that the data within the Low Nibble and the High Nibble is an RLE count. The remaining seven bits within the Low Nibble and the High Nibble represent the RLE count. Therefore, the maximum RLE count is 128 (ranging from 0 to 127). An RLE count of 0 indicates that the character should be repeated one time. An RLE count of 127 indicates that the character should be repeated 128 times. For example, if a particular character such as a horizontal line is repeated 25 times to form the boundary of a table, the system 100 would transfer the RLE count of 24 for this example to the printer 10 (in two nibbles, as described above) followed by the data representing the character itself, again in two nibbles. Thus, 25 characters of data are transferred using only four I/O operations.

Figure 6A:
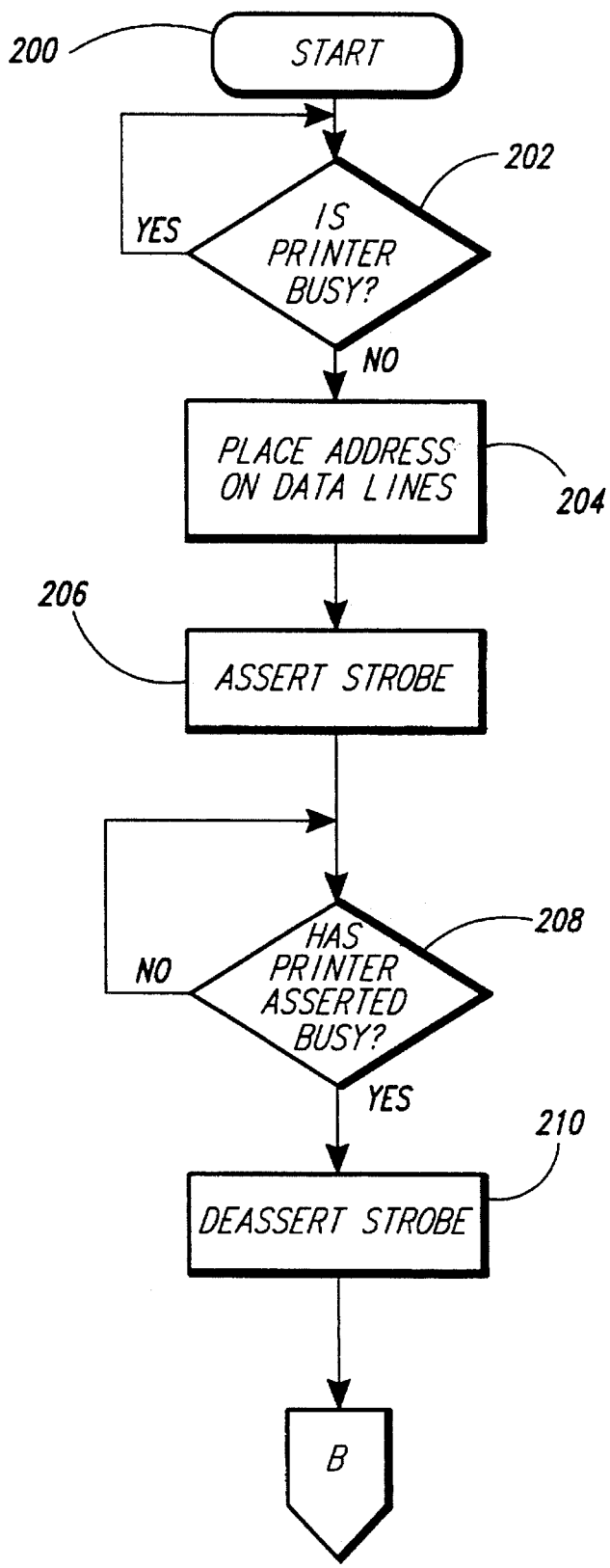
FIGS. 6A and 6B are flow charts illustrating the method of use of the inventive system of FIG. 3B.
Figure 6B:
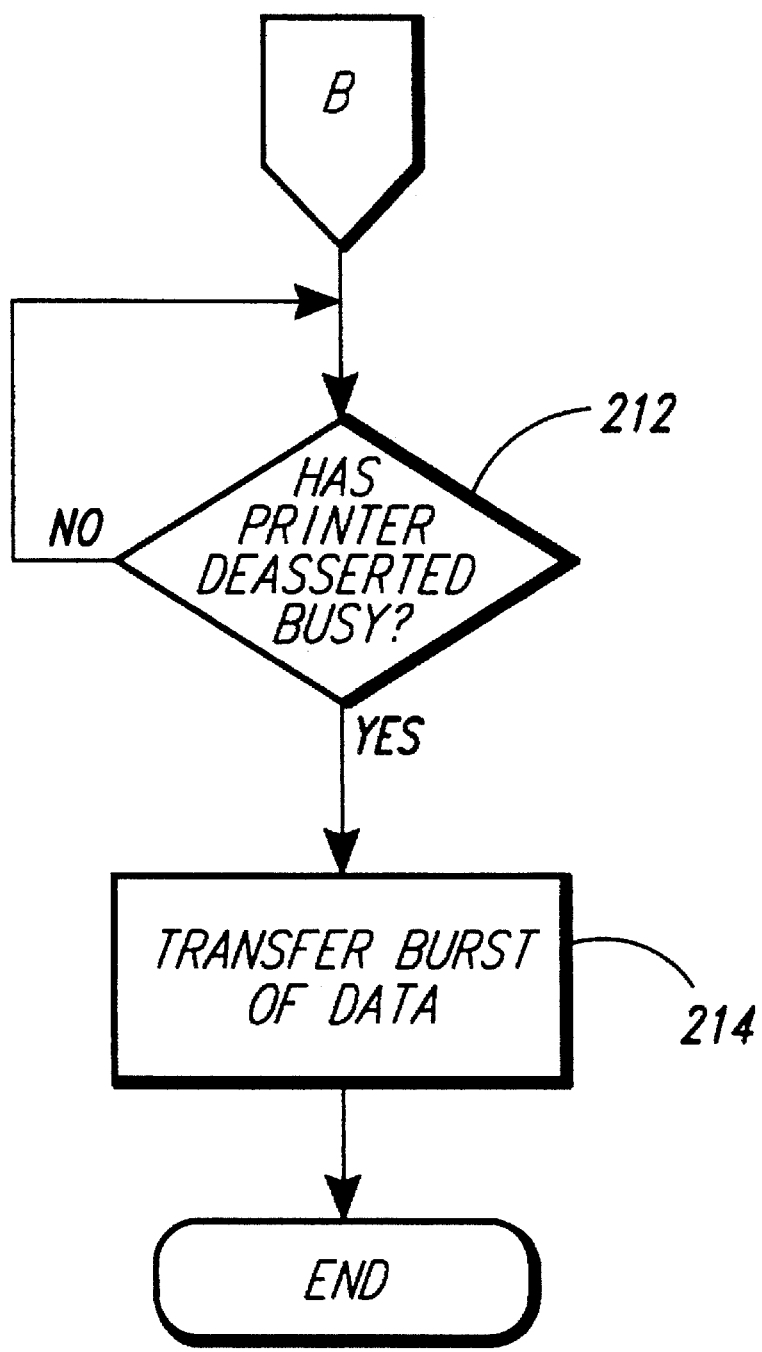

The inventive method is easily implemented on any computer. The flow charts of FIGS. 6A and 6B illustrate the method implemented by the system 100. The process of transferring data starts at 200 in FIG. 6A. In decision block 202, the I/O interface 14 (see FIG. 3B) checks the status of the printer 10 to determine if the printer can accept a data burst. If the printer 10 cannot accept data, the result of decision block 202 is YES, and the system 100 loops back until the printer is not busy. If the printer 10 is not busy, the result of decision block 202 is NO. In that case, the host computer 16 places the Address 0 on the data lines in step 204. In the presently preferred embodiment, the transfer of the address in step 204 occurs in the same manner as a prior art data transfer would occur. That is, the host computer 16 waits until the printer 10 is not busy and transfers a byte of data rather than breaking the byte of data into two nibbles. In step 206, the system 100 asserts the STROBE line to indicate to the printer 10 that the address data on the data lines of the interface cable 28 is valid. In decision block 208, the system 100 checks to see if the printer 10 has asserted the BUSY line, indicating acceptance of the data, as described above. If the printer 10 has not asserted the BUSY line, the result of decision block 208 is NO, and the system loops back to continue checking. If the printer 10 has asserted the BUSY line, the result of decision block 208 is YES. In that case, the system 100 deasserts the STROBE line in step 210, indicating that the host computer 16 considers the transfer a success.

In decision block 212 of FIG. 6B, the system 100 checks to see if the printer 10 has deasserted the BUSY line, indicating the readiness of the printer to accept a burst of data. If the printer 10 has not deasserted the BUSY line, the result of decision block 212 is NO, and the system loops back to continue checking. If the printer 10 has deasserted the BUSY line, the result of decision block 212 is YES. In that case, the system 100 transfers a burst of data using the data format shown in Table 1.

The method described with respect to FIGS. 6A and 6B continues for each 4 Kbyte burst of data transferred from the host computer 16 to the printer 10. Thus, the speed of data transfer has been increased while maintaining or improving reliability of data transfer. Those skilled in the art will appreciate that many different hardware configuration can be used to practice the invention.

Thus, the rate of data transfer has been increased while maintaining or improving reliability of data transfer. Those skilled in the art will appreciate that many different hardware configuration can be used to practice the invention.

While the above description illustrates a system for improving data transfer between the host computer 16 and the printer 10, it is obvious that the inventive system and method can be used with peripherals other than printers. For example, a facsimile machine could be attached to the host computer 16 instead of the printer 10. Thus, the system 100 can increase the rate of data transfer to any peripheral.

It is to be understood that, even though various embodiments and advantages have been set forth in the foregoing description, the above disclosure is illustrative only, and changes may be made in detail and yet remain within the broad principles of the present invention. Therefore, the present invention is to be limited only by the appended claims.

I claim:

1. A system for transferring data between a host computer and a printer, comprising:

an output interface on the host computer to transfer a byte of printer data to the printer by apportioning said byte of printer data into a first portion of first and second transmitted data bytes, said first and second transmitted data bytes each further including a second portion containing first and second clock signals each having first and second logic levels, said second clock signal being a logically inverted version of said first clock signal, each of said second portions also containing a parity data bit;

an input register within the printer to receive said first and second transmitted data bytes and temporarily store said first and second transmitted data bytes;

a parity error checker, coupled to said input register, to analyze said stored first and second transmitted data bytes and generate a parity error signal if a parity error occurred within said first and second transmitted data bytes;

a clock detection circuit, coupled to said input registers, to receive said first and second clock signals from said stored first and second transmitted data bytes, said clock detection circuit generating a first delayed signal when said first clock signal has made a transition from said first logic level to said second logic level and said second clock signal has made a transition from said second logic level to said first logic level, and generating a second delayed signal when said first clock signal has made a transition from said second logic level to said first logic level and said second clock signal has made a transition from said first logic level to said second logic level;

a first storage register, coupled to said input register and enabled by said first delayed signal, to store said first portion of said stored first transmitted data byte when said first delayed signal is received; and a second storage register, coupled to said input register and enabled by said second delayed signal, to store said first portion of said stored second transmitted data byte when said second delayed signal is received, whereby said first portions of said stored first and second transmitted data bytes are transmitted from the host computer to the printer and can be reformed as said byte of printer data.

2. The system of claim 1, further including a printer storage register, coupled to said first and second storage registers, to receive both said first portion of said first transmitted data byte and said first portion of said second transmitted data byte to combine said first portions and reform said byte of printer data.

3. The system of claim 1 wherein said stored data bytes include out-of-band data indicating a number of times that said byte of printer data is to be repeated.

4. The system of claim 3 wherein a part of said second portion of said first or second transmitted data byte indicates the presence of said out-of-band data.

5. A system for transferring data between a host computer and a printer, comprising:

an output interface on the host computer to transfer a byte of printer data to the printer by apportioning said byte of printer data into a first portion of first and second transmitted data bytes, said first and second transmitted data bytes each further including a second portion containing first and second clock signals each having first and second logic levels, said second clock signal being a logically inverted version of said first clock signal, each of said second portions also containing a parity data bit;

a clock detection circuit to receive said first and second clock signals from said first and second transmitted data bytes, said clock detection circuit generating a first delayed signal when said first clock signal has made a transition from said first logic level to said second logic level and said second clock signal has made a transition from said second logic level to said first logic level, and generating a second delayed signal when said first clock signal has made a transition from said second logic level to said first logic level and said second clock signal has made a transition from said first logic level to said second logic level;

a first storage register enabled by said first delayed signal, to store said first portion of said first transmitted data byte when said first delayed signal is received; and a second storage register enabled by said second delayed signal, to store said first portion of said second transmitted data byte when said second delayed signal is received, whereby said first portions of said first and second transmitted data bytes are transmitted from the host computer to the printer and can be reformed as said byte of printer data.

6. The system of claim 5, further including an input register within the printer to receive said first and second transmitted data bytes and temporarily store said first and second transmitted data bytes for supply to said clock detection circuit, and said first and second storage registers.

7. The system of claim 5 wherein said second portions of said first and second transmitted data bytes each includes a parity bit, and the system, further including a parity error checker to analyze said first and second transmitted data bytes and generate a parity error signal if a parity error occurred within said first and second transmitted data bytes.

8. A system for transferring data between a host computer and a printer, the host computer containing an output interface on the host computer to transfer a byte of printer data to the printer by apportioning said byte of printer data into a first portion of first and second transmitted data bytes, said first and second transmitted data bytes each further including a second portion containing first and second clock signals each having first and second logic levels, said second clock signal being a logically inverted version of said first clock signal, each of said second portions also containing a parity data bit, the system comprising:

an input register within the printer to receive the first and second transmitted data bytes and temporarily store the first and second transmitted data bytes;

a parity error checker, coupled to said input register, to analyze said stored first and second transmitted data bytes and generate a parity error signal if a parity error occurred within the first and second transmitted data bytes;

a clock detection circuit, coupled to said input registers, to receive said first and second clock signals from said stored first and second transmitted data bytes, said clock detection circuit generating a first delayed signal when said first clock signal has made a transition from said first logic level to said second logic level and said second clock signal has made a transition from said second logic level to said first logic level, and generating a second delayed signal when said first clock signal has made a transition from said second logic level to said first logic level and said second clock signal has made a transition from said first logic level to said second logic level;

a first storage register, coupled to said input register and enabled by said first delayed signal, to store said first portion of said stored first transmitted data byte when said first delayed signal is received; and a second storage register, coupled to said input register and enabled by said second delayed signal, to store said first portion of said stored second transmitted data byte when said second delayed signal is received, whereby said first portions of said stored first and second transmitted data bytes are transmitted from the host computer to the printer and can be reformed as said byte of printer data.

9. A system for transferring data between a host computer and a printer, the host computer containing an output interface on the host computer to transfer a byte of printer data to the printer by apportioning said byte of printer data into a first portion of first and second transmitted data bytes, said first and second transmitted data bytes each further including a second portion containing first and second clock signals each having first and second logic levels, said second clock signal being a logically inverted version of said first clock signal, the system comprising:

a clock detection circuit to receive the first and second clock signals from the first and second transmitted data bytes, said clock detection circuit generating a first delayed signal when the first clock signal has made a transition from the first logic level to the second logic level and the second clock signal has made a transition from the second logic level to the first logic level, and generating a second delayed signal when the first clock signal has made a transition from the second logic level to the first logic level and the second clock signal has made a transition from the first logic level to the second logic level;

a first storage register enabled by said first delayed signal, to store the first portion of the first transmitted data byte when said first delayed signal is received; and a second storage register enabled by said second delayed signal, to store the first portion of the second transmitted data byte when said second delayed signal is received, whereby the stored first portions of the first and second bytes of data are transmitted from the host computer to the printer and can be reformed as the byte of printer data.

10. The system of claim 9, further including an input register within the printer to receive said first and second transmitted data bytes and temporarily store said first and second transmitted data bytes for supply to said clock detection circuit, and said first and second storage registers.

11. The system of claim 9 wherein said second portions of said first and second transmitted data bytes each includes a parity bit, and the system, further including a parity error checker to analyze said first and second transmitted data bytes and generate a parity error signal if a parity error occurred within said first and second transmitted data bytes.

12. A system for transferring data between a host computer and a printer, the host computer containing an output interface on the host computer to transfer a byte of printer data to the printer by apportioning said byte of printer data into a first portion of first and second transmitted data bytes, the first and second transmitted data bytes each further including a second portion containing first and second clock signals each having first and second logic levels, the second clock signal being a logically inverted version of the first clock signal, the system comprising:

a clock detection circuit to receive the first and second clock signals from the first and second transmitted data bytes and generate first and second delayed signals;

a first storage register enabled by said first delayed signal, to store the first portion of the first transmitted data byte when said first delayed signal is received; and a second storage register enabled by said second delayed signal, to store the first portion of the second transmitted data byte when said second delayed signal is received, whereby the stored first portions of the first and second bytes of data are transmitted from the host computer to the printer and can be reformed as the byte of printer data.

13. The system of claim 12, further including an input register within the printer to receive said first and second transmitted data bytes and temporarily store said first and second transmitted data bytes for supply to said clock detection circuit, and said first and second storage registers.

14. The system of claim 12 wherein said second portions of said first and second transmitted data bytes each includes a parity bit, and the system, further including a parity error checker to analyze said first and second transmitted data bytes and generate a parity error signal if a parity error occurred within said first and second transmitted data bytes.

15. A system for transferring data between a host computer and a printer, the printer containing a clock detection circuit to receive first and second clock signals from the host computer and generate first and second delayed signals and first and second storage registers enabled by the first and second delayed signals, respectively, to store portions of the data transmitted from the host computer, the system comprising:

a data file within the host computer storing a plurality of bytes of printer data to be transmitted from the host computer to the printer; and an output interface on the host computer to transfer each of said plurality of bytes of printer data to the printer by apportioning each of said byte of printer data into a first portion of first and second transmitted data bytes, said first and second transmitted data bytes each further including a second portion containing the first and second clock signals each having first and second logic levels, the second clock signal being a logically inverted version of the first clock signal.

16. The system of claim 15 wherein the printer contains a parity error checker to analyze said first and second transmitted data bytes and generate a parity error signal if a parity error occurred within said first and second transmitted data bytes, said output interface further including a parity bit in each of said second portions of said first and second transmitted data bytes.

17. A system for transferring data between a host computer and a peripheral, comprising:

an output interface on the host computer to transfer a byte of peripheral data to the peripheral by apportioning said byte of peripheral data into a first portion of first and second transmitted data bytes, said first and second transmitted data bytes each further including a second portion containing first and second clock signals each having first and second logic levels, said second clock signal being a logically inverted version of said first clock signal, each of said second portions also containing a parity data bit;

a clock detection circuit to receive said first and second clock signals from said first and second transmitted data bytes, said clock detection circuit generating a first delayed signal when said first clock signal has made a transition from said first logic level to said second logic level and said second clock signal has made a transition from said second logic level to said first logic level, and generating a second delayed signal when said first clock signal has made a transition from said second logic level to said first logic level and said second clock signal has made a transition from said first logic level to said second logic level;

a first storage register enabled by said first delayed signal, to store said first portion of said first transmitted data byte when said first delayed signal is received; and a second storage register enabled by said second delayed signal, to store said first portion of said second transmitted data byte when said second delayed signal is received, whereby said first portions of said first and second transmitted data bytes are transmitted from the host computer to the peripheral and can be reformed as said byte of peripheral data.

18. The system of claim 17, further including an input register within the peripheral to receive said first and second transmitted data bytes and temporarily store said first and second transmitted data bytes for supply to said clock detection circuit, and said first and second storage registers.

19. The system of claim 17 wherein said second portions of said first and second transmitted data bytes each includes a parity bit, and the system, further including a parity error checker to analyze said first and second transmitted data bytes and generate a parity error signal if a parity error occurred within said first and second transmitted data bytes.

20. A system for transferring data between a host computer and a peripheral, the host computer containing an output interface on the host computer to transfer a byte of peripheral data to the peripheral by apportioning said byte of peripheral data into a first portion of first and second transmitted data bytes, said first and second transmitted data bytes each further including a second portion containing first and second clock signals each having first and second logic levels, said second clock signal being a logically inverted version of said first clock signal, the system comprising:

a clock detection circuit to receive the first and second clock signals from the first and second transmitted data bytes, said clock detection circuit generating a first delayed signal when the first clock signal has made a transition from the first logic level to the second logic level and the second clock signal has made a transition from the second logic level to the first logic level, and generating a second delayed signal when the first clock signal has made a transition from the second logic level to the first logic level and the second clock signal has made a transition from the first logic level to the second logic level;

a first storage register enabled by said first delayed signal, to store the first portion of the first transmitted data byte when said first delayed signal is received; and a second storage register enabled by said second delayed signal, to store the first portion of the second transmitted data byte when said second delayed signal is received, whereby the stored first portions of the first and second bytes of data are transmitted from the host computer to the peripheral and can be reformed as the byte of peripheral data.

21. The system of claim 20, further including an input register within the peripheral to receive said first and second transmitted data bytes and temporarily store said first and second transmitted data bytes for supply to said clock detection circuit, and said first and second storage registers.

22. The system of claim 20 wherein said second portions of said first and second transmitted data bytes each includes a parity bit, and the system, further including a parity error checker to analyze said first and second transmitted data bytes and generate a parity error signal if a parity error occurred within said first and second transmitted data bytes.

23. A system for transferring data between a host computer and a peripheral, the host computer containing an output interface on the host computer to transfer a byte of peripheral data to the peripheral by apportioning said byte of peripheral data into a first portion of first and second transmitted data bytes, the first and second transmitted data bytes each further including a second portion containing first and second clock signals each having first and second logic levels, the second clock signal being a logically inverted version of the first clock signal, the system comprising:

a clock detection circuit to receive the first and second clock signals from the first and second transmitted data bytes and generate first and second delayed signals;

a first storage register enabled by said first delayed signal, to store the first portion of the first transmitted data byte when said first delayed signal is received; and a second storage register enabled by said second delayed signal, to store the first portion of the second transmitted data byte when said second delayed signal is received, whereby the stored first portions of the first and second bytes of data are transmitted from the host computer to the peripheral and can be reformed as the byte of peripheral data.

24. The system of claim 23, further including an input register within the peripheral to receive said first and second transmitted data bytes and temporarily store said first and second transmitted data bytes for supply to said clock detection circuit, and said first and second storage registers.

25. The system of claim 23 wherein said second portions of said first and second transmitted data bytes each includes a parity bit, and the system, further including a parity error checker to analyze said first and second transmitted data bytes and generate a parity error signal if a parity error occurred within said first and second transmitted data bytes.

26. A method in a host computer system attached to a printer of transferring a byte of data between the host computer and the printer, the method comprising the steps of:

(a) apportioning a byte of printer data into a first portion of first and second transmitted data bytes, said first and second transmitted data bytes each further including a second portion containing first and second clock signals each having first and second logic levels, said second clock signal being a logically inverted version of said first clock signal;

(b) transferring said first transmitted data byte with said second portion thereof having said first clock signal at said first logic level;

(c) latching said first portion of said first transmitted data byte in a first storage location within the printer following the arrival of both said first and second clock signals within the printer;

(d) transferring said second transmitted data byte with said second portion thereof having said first clock signal at said second logic level; and (e) latching said first portion of said second transmitted data byte in a second storage location within the printer following the arrival of both said first and second clock signals within the printer, whereby said first portions of said first and second transmitted data bytes are transmitted from the host computer to the printer and can be reformed as said byte of printer data.

27. The method of claim 26, further including the step of generating a predetermined delay period following the arrival of both said first and second clock signals within the printer, said steps (c) and (e) of latching occurring after said delay period.

28. The method of claim 26, further including transmitting out-of-band information indicating whether said first and second transmitted data bytes are out-of-band data as a part of said second portion of said first or second transmitted data bytes, the pointer using said out-of-band information to detect the presence of said out-of-band data.

29. The method of claim 26, further including transmitting parity information as part of said second portion of each of said first and second transmitted data bytes, the printer using said parity information to detect errors in the transfer of said first and second transmitted data bytes from the host computer to the printer.

30. A method in a host computer system attached to a printer of transferring a byte of printer data between the host computer and the printer, the byte of printer data being apportioned into a first portion of first and second transmitted data bytes, the first and second transmitted data bytes each further including a second portion containing first and second clock signals each having first and second logic levels, the second clock signal being a logically inverted version of the first clock signal, the method comprising the steps of the method comprising the steps of:

(a) transferring the first transmitted data byte with the second portion thereof having the first clock signal at the first logic level;

(b) latching the first portion of the first transmitted data byte in a first storage location within the printer following the arrival of both the first and second clock signals within the printer;

(c) transferring the second transmitted data byte with the second portion thereof having the first clock signal at the second logic level; and (d) latching the first portion of the second transmitted data byte in a second storage location within the printer following the arrival of both the first and second clock signals within the printer, whereby the first portions of the first and second transmitted data bytes are transmitted from the host computer to the printer and can be reformed as the byte of printer data.

31. The method of claim 30, further including the step of generating a predetermined delay period following the arrival of both the first and second clock signals within the printer, said steps (c) and (e) of latching occurring after said delay period.

32. The method of claim 30, further including transmitting out-of-band information indicating whether the first and second transmitted data bytes are out-of-band data as a part of the second portion of the first or second transmitted data bytes, the printer using said out-of-band information to detect the presence of said out-of-band data.

33. A method in a host computer system attached to a printer of transferring a byte of printer data between the host computer and the printer, the byte of printer data being apportioned into a first portion of first and second transmitted data bytes, the first and second transmitted data bytes each further including a second portion containing first and second clock signals each having first and second logic levels, the second clock signal being a logically inverted version of the first clock signal, the method comprising the steps of the method comprising the steps of:

(a) latching the first portion of the first transmitted data byte in a first storage location within the printer following the arrival of both the first and second clock signals within the printer, the first clock signal having the first logic level; and (b) latching the first portion of the second transmitted data byte in a second storage location within the printer following the arrival of both the first and second clock signals within the printer, the first clock signal having the second logic level.

34. The method of claim 33, further including the step of generating a predetermined delay period following the arrival of both the first and second clock signals within the printer, said steps (c) and (e) of latching occurring after said delay period.

35. The method of claim 33, further including transmitting out-of-band information indicating whether the first and second transmitted data bytes are out-of-band data as a part of the second portion of the first or second transmitted data bytes, the printer using said out-of band information to detect the presence of said out-of-band data.

36. A method of transferring compressed data between a host computer and a printer attached to a parallel printer port on the host computer by a printer cable, the method comprising the steps of:

(a) apportioning a byte of printer data into a first portion of first and second transmitted data bytes, said first and second transmitted data bytes each further including a second portion containing first and second clock signals each having first and second logic levels, said second clock signal being a logically inverted version of said first clock signal, said second portion of said first or second transmitted data bytes also containing a signal indicating that said first portion of said first transmitted data byte is a first portion of a count number indicating the number of times that a character is to be repeated by the printer and said first portion of said second transmitted data byte being a second portion of said count number indicating the number of times that a character is to be repeated by the printer;

(b) transferring said first transmitted data byte with said second portion thereof having said first clock signal at said first logic level;

(c) latching said first portion of said first transmitted data byte in a first storage location within the printer following the arrival of both said first and second clock signals within the printer;

(d) transferring said second transmitted data byte with said second portion thereof having said first clock signal at said second logic level;

(e) latching said first portion of said second transmitted data byte in a second storage location within the printer following the arrival of both said first and second clock signals within the printer, whereby said first portions of said first and second transmitted data bytes are transmitted from the host computer to the printer and are reformed as said count number;

(f) apportioning a byte of printer data into a first portion of first and second transmitted data bytes, said first and second transmitted data bytes each further including a second portion containing first and second clock signals each having first and second logic levels, said second clock signal being a logically inverted version of said first clock signal;

(g) transferring said first transmitted data byte with said second portion thereof having said first clock signal at said first logic level;

(h) latching said first portion of said first transmitted data byte in a first storage location within the printer following the arrival of both said first and second clock signals within the printer;

(i) transferring said second transmitted data byte with said second portion thereof having said first clock signal at said second logic level;

(j) latching said first portion of said second transmitted data byte in a second storage location within the printer following the arrival of both said first and second clock signals within the printer, whereby said first portions of said first and second transmitted data bytes are transmitted from the host computer to the printer and can be reformed as said byte of printer data; and (k) repeatedly printing the character transferred and latched in steps (g)–(h) the number of times represented by said count number resulting from steps (b)–(e).

37. The method of claim 36, further including the step of generating a predetermined delay period following the arrival of both said first and second clock signals within the printer, said steps (c), (e), (h), and (j) of latching occurring after said delay period.

38. A method in a host computer system attached to a peripheral of transferring a byte of data between the host computer and the peripheral, the method comprising the steps of:

(a) apportioning a byte of peripheral data into a first portion of first and second transmitted data bytes, said first and second transmitted data bytes each further including a second portion containing first and second clock signals each having first and second logic levels, said second clock signal being a logically inverted version of said first clock signal;

(b) transferring said first transmitted data byte with said second portion thereof having said first clock signal at said first logic level;

(c) latching said first portion of said first transmitted data byte in a first storage location within the peripheral following the arrival of both said first and second clock signals within the peripheral;

(d) transferring said second transmitted data byte with said second portion thereof having said first clock signal at said second logic level; and (e) latching said first portion of said second transmitted data byte in a second storage location within the peripheral following the arrival of both said first and second clock signals within the peripheral, whereby said first portions of said first and second transmitted data bytes are transmitted from the host computer to the peripheral and can be reformed as said byte of peripheral data.

39. The method of claim 38, further including the step of generating a predetermined delay period following the arrival of both said first and second clock signals within the peripheral, said steps (c) and (e) of latching occurring after said delay period.

40. The method of claim 38, further including transmitting out-of-band information indicating whether said first and second transmitted data bytes are out-of-band data as a part of said second portion of said first or second transmitted data bytes, the pointer using said out-of-band information to detect the presence of said out-of-band data.

41. The method of claim 38, further including transmitting parity information as part of said second portion of each of said first and second transmitted data bytes, the peripheral using said parity information to detect errors in the transfer of said first and second transmitted data bytes from the host computer to the peripheral.

42. A method in a host computer system attached to a peripheral of transferring a byte of peripheral data between the host computer and the peripheral, the byte of peripheral data being apportioned into a first portion of first and second transmitted data bytes, the first and second transmitted data bytes each further including a second portion containing first and second clock signals each having first and second logic levels, the second clock signal being a logically inverted version of the first clock signal, the method comprising the steps of the method comprising the steps of:

(a) transferring the first transmitted data byte with the second portion thereof having the first clock signal at the first logic level:

(b) latching the first portion of the first transmitted data byte in a first storage location within the peripheral following the arrival of both the first and second clock signals within the peripheral;

(c) transferring the second transmitted data byte with the second portion thereof having the first clock signal at the second logic level; and (d) latching the first portion of the second transmitted data byte in a second storage location within the peripheral following the arrival of both the first and second clock signals within the peripheral, whereby the first portions of the first and second transmitted data bytes are transmitted from the host computer to the peripheral and can be reformed as the byte of peripheral data.

43. The method of claim 42, further including the step of generating a predetermined delay period following the arrival of both the first and second clock signals within the peripheral, said steps (c) and (e) of latching occurring after said delay period.

44. The method of claim 42, further including transmitting out-of-band information indicating whether the first and second transmitted data bytes are out-of-band data as a part of the second portion of the first or second transmitted data bytes, the peripheral using said out-of-band information to detect the presence of said out-of-band data.

45. A method in a host computer system attached to a peripheral of transferring a byte of data between the host computer and the peripheral, the method comprising the steps of:

(a) apportioning a byte of peripheral data into a first portion of first and second transmitted data bytes, said first and second transmitted data bytes each further including a second portion containing first and second clock signals each having first and second logic levels, said second clock signal being a logically inverted version of said first clock signal;

(b) transferring said first transmitted data byte with said second portion thereof having said first clock signal at said first logic level;

(c) digitally filtering said first and second clock signals within the peripheral to generate first and second digitally filtered clock signals;

(d) latching said first portion of said first transmitted data byte in a first storage location within the peripheral using said first and second digitally filtered clock signals;

(e) transferring said second transmitted data byte with said second portion thereof having said first clock signal at said second logic level:

(f) digitally filtering said first and second clock signals within the peripheral to generate said first and second digitally filtered clock signals; and (g) latching said first portion of said second transmitted data byte in a second storage location within the peripheral using said first and second digitally filtered clock signals, whereby said first portions of said first and second transmitted data bytes are transmitted from the host computer to the peripheral and can be reformed as said byte of peripheral data.

* * * * *

UNITED STATES PATENT AND TRADEMARK OFFICE
CERTIFICATE OF CORRECTION

PATENT NO. : 5,461,701
DATED : October 24, 1995
INVENTOR(S) : David W. Voth

It is certified that error appears in the above-indentified patent and that said Letters Patent is hereby corrected as shown below:

On the title page, under heading [57], line 12, please delete "panty" and insert therefor --parity--

In column 17, claim 31, line 67, please delete "(c) and (e)" and insert therefor --(b) and (d)--.

In column 18, claim 34, line 31, please delete "(c) and (e)" and insert therefor --(a) and (b)--.

In column 20, claim 43, line 53, please delete "(c) and (e)" and insert therefor --(b) and (d)--.

Signed and Sealed this

Fifth Day of March, 1996

*Attest:*

BRUCE LEHMAN

*Attesting Officer*   *Commissioner of Patents and Trademarks*